United States Patent
Watanabe

(10) Patent No.: US 9,668,292 B2
(45) Date of Patent: May 30, 2017

(54) WIRELESS COMMUNICATION SYSTEM, MOBILE STATION, SERVER, AND WIRELESS COMMUNICATION METHOD

(71) Applicant: FUJITSU LIMITED, Kawasaki-shi, Kanagawa (JP)

(72) Inventor: Naotoshi Watanabe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 81 days.

(21) Appl. No.: 14/708,986

(22) Filed: May 11, 2015

(65) Prior Publication Data

US 2015/0245408 A1  Aug. 27, 2015

Related U.S. Application Data

(63) Continuation of application No. PCT/JP2012/082570, filed on Dec. 14, 2012.

(51) Int. Cl.
*H04W 4/00* (2009.01)
*H04B 7/216* (2006.01)
(Continued)

(52) U.S. Cl.
CPC ....... *H04W 76/028* (2013.01); *H04L 65/1016* (2013.01); *H04L 65/1063* (2013.01);
(Continued)

(58) Field of Classification Search
CPC .... H04L 65/1073; H04L 67/14; H04L 67/145
See application file for complete search history.

(56) References Cited

U.S. PATENT DOCUMENTS 8,559,392 B2 * 10/2013 Ramankutty ..... H04W 36/0033
370/331
9,451,583 B2 * 9/2016 Okabe ................. H04W 68/005
(Continued)

FOREIGN PATENT DOCUMENTS

EP  1 973 283 A1  9/2008
JP  2009-517933  4/2009
(Continued)

OTHER PUBLICATIONS

Extended European search report with the supplementary European search report and the European search opinion issued for corresponding European Patent Application No. 12889793.1 mailed on Oct. 22, 2015.
(Continued)

*Primary Examiner* — Melanie Jagannathan
(74) *Attorney, Agent, or Firm* — Myers Wolin, LLC

(57) ABSTRACT

A UE is a mobile station that communicates with a CSCF server. The UE includes a network IF and a mobile network service control unit. By using an IMS signaling bearer established between the UE and the CSCF server, the network IF registers the usage of a predetermined service in the CSCF server. After the usage of the service has been registered by the network IF, the mobile network service control unit releases the IMS signaling bearer. Furthermore, when the CSCF server detects the occurrence of the service to be provided to the UE, the mobile network service control unit re-establishes the released IMS signaling bearer in response to the request from the CSCF server, due to a notification sent from the application server to the UE indicating the occurrence of the service.

7 Claims, 18 Drawing Sheets

(51) Int. Cl.
- *H04W 76/02* (2009.01)
- *H04L 29/06* (2006.01)
- *H04M 1/725* (2006.01)
- *H04W 60/00* (2009.01)
- *H04W 80/10* (2009.01)

(52) U.S. Cl.
CPC ...... *H04L 65/1073* (2013.01); *H04L 65/1083* (2013.01); *H04M 1/72522* (2013.01); *H04W 60/00* (2013.01); *H04W 80/10* (2013.01)

(56) References Cited

U.S. PATENT DOCUMENTS

| | | | |
|---|---|---|---|
| 2005/0078642 A1* | 4/2005 | Mayer | H04W 76/062 370/338 |
| 2007/0238466 A1 | 10/2007 | Buckley et al. | |
| 2009/0010271 A1* | 1/2009 | Bachmann | H04L 12/14 370/401 |
| 2009/0170512 A1* | 7/2009 | Regnier | H04L 65/1073 455/435.1 |
| 2010/0046451 A1 | 2/2010 | Tada et al. | |
| 2010/0272096 A1 | 10/2010 | Witzel et al. | |
| 2012/0052866 A1* | 3/2012 | Froehlich | H04L 47/14 455/445 |
| 2013/0016658 A1* | 1/2013 | Lovsen | H04W 76/028 370/328 |
| 2013/0142120 A1 | 6/2013 | Nishida et al. | |
| 2014/0317300 A1* | 10/2014 | Ludwig | H04W 76/064 709/226 |

FOREIGN PATENT DOCUMENTS

| | | |
|---|---|---|
| JP | 2009-522963 | 6/2009 |
| JP | 2012-004847 | 1/2012 |
| JP | 2012-532504 | 12/2012 |
| WO | 2007/062674 | 6/2007 |
| WO | 2007/079578 | 7/2007 |
| WO | 2008/096527 | 8/2008 |
| WO | 2011/008563 | 1/2011 |

OTHER PUBLICATIONS

3GPP, "3rd Generation Partnership Project; Technical Specification Group Services and System Aspects; IP Multimedia Subsystem (IMS) centralized services; Stage 2 (Release 10)", 3GPP TS 23.292, V10.3.0, 3GPP, Sophia Antipolis, Valbonne, France, Mar. 2011.

International Search Report (ISR) issued for corresponding international patent application No. PCT/JP2012/082570, mailed Mar. 5, 2013. English translation attached.

* cited by examiner

WIRELESS COMMUNICATION SYSTEM, MOBILE STATION, SERVER, AND WIRELESS COMMUNICATION METHOD

CROSS-REFERENCE TO RELATED APPLICATION

This application is a continuation application of International Application PCT/JP2012/082570, filed on Dec. 14, 2012 and designating the U.S., the entire contents of which are incorporated herein by reference.

FIELD

The embodiments discussed herein are directed to a wireless communication system, a mobile station, a server, and a wireless communication method.

BACKGROUND

Conventionally, Long Term Evolution (LTE) standardized in $3^{rd}$ Generation Partnership Project (3GPP) is becoming widely used as a new wireless communication method. In LTE, providing Voice over LTE (VoLTE) that is a voice service using the Internet protocol Multimedia Subsystem (IMS) is being prepared as a multimedia service based on the Internet Protocol (IP). In VoLTE, in addition to a default bearer that is a communication path used for general data, an IMS call process Session Initiation Protocol (SIP) signaling bearer (hereinafter, referred to as an "IMS signaling bearer") that is a communication path used for controlling voice data is used.

Each of the bearers is, for example, the bearers defined in TR 23.854 (Sec 6.1.3.2.1), TS 23.203 (Sec 6.2.4), and the like in 3GPP. Unlike a default bearer used for user data communication (hereinafter, simply referred to as a "default bearer"), a dedicated access point network (APN: Access Point Name) is provided with an IMS signaling bearer. The APN is specified to enable to establish emergency communication with a local agency in an international roaming network without passing through the home network. Specifically, the wireless communication system provides an incoming call service for a mobile station by continuously setting the IMS signaling bearer described above between the APN and a mobile station (UE: user equipment).

Patent Document 1: International Publication Pamphlet No. WO 2008/096527

However, in the technology described above, high-quality voice communication is possible but there is the following problem. For example, the wireless communication system always needs to ensure the resource in order to maintain an IMS signaling bearer. Furthermore, if an address conversion device (NAT: Network Address Translator) is present between the Evolved Packet Core (EPC) and an IMS call process server (CSCF: Call Session Control Function), the wireless communication system performs periodical keep alive communication in order to maintain address conversion information. Consequently, although no transmission addressed to a mobile station is present, the wireless resource between the mobile station and a base station is consumed.

SUMMARY

According to an aspect of the embodiments, a wireless communication system includes a mobile station and a first server that communicates with the mobile station. The mobile station includes a registering unit and a first control unit. The registering unit registers, in the first server by using a communication path established between the mobile station and the first server, the usage of a predetermined service. The first control unit releases the communication path after the usage of the service has been registered by the registering unit. The first server includes a detecting unit and a requesting unit. The detecting unit detects occurrence of the service provided to the mobile station. The requesting unit requests, when the occurrence of the service is detected by the detecting unit, a second server to notify the mobile station of the occurrence of the service. The first control unit in the mobile station re-establishes, in response to the request from the requesting unit, due to a notification indicating the occurrence of the service, sent from the second server to the mobile station, the communication path that has been released by the first control unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of a wireless communication system, a mobile station, a server, and a wireless communication method disclosed in the present invention will be described in detail below with reference to the accompanying drawings. The wireless communication system, the mobile station, the server, and the wireless communication method disclosed in the present invention are not limited to the embodiments described below.

[a] First Embodiment

Figure 1:
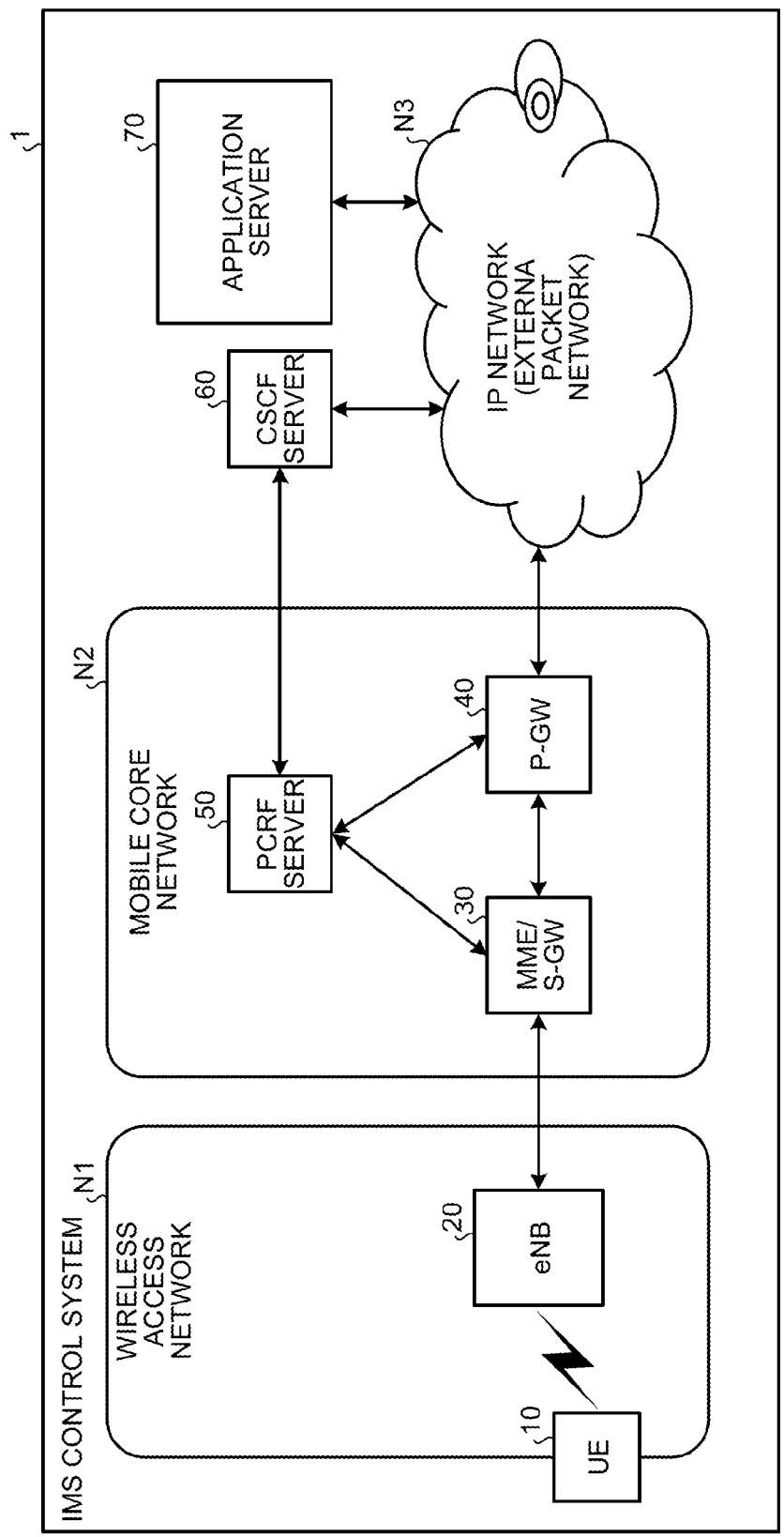
FIG. 1 is a schematic drawing illustrating the configuration of an IMS control system.

In the following, the configuration of an IMS control system according to an embodiment disclosed in the present invention will be described. The IMS control system is a wireless communication system in which LTE is used as wireless communication. FIG. 1 is a schematic drawing illustrating the configuration of an IMS control system 1. As illustrated in FIG. 1, the IMS control system 1 includes, in a wireless access network N1, a UE 10 functioning as a mobile station and an eNB 20 functioning as a base station. Furthermore, the IMS control system 1 includes, in a mobile core network N2, a mobility management entity (MME)/serving gateway (S-GW) 30, a Packet data network-gateway (P-GW) 40, and a policy and charging rules function (PCRF) server 50. Furthermore, the IMS control system 1 includes a call session control function (CSCF) server 60 and an application server 70. In a description below, the MME/S-GW 30 is simply referred to as an "MME 30".

In the IMS control system 1, because the eNB 20 is connected to the MME 30 by using a wired connection, the wireless access network N1 and the mobile core network N2 can mutually send and receive various kinds of signals and data. Similarly, because the P-GW 40 is connected to an Internet Protocol (IP) network N3 that is an external packet network by using a wired connection, the mobile core network N2 and the IP network N3 can mutually send and receive various kinds of signals and data. Furthermore, the PCRF server 50 is connected to the IP network N3 via the CSCF server 60 by using a wired connection and is connected to, ahead of the CSCF server 60, the application server 70 by using a wired connection. Consequently, when the CSCF server 60 receives, for example, an IMS service request from a corresponding node (CN) 80 in an external packet network, the UE 10 can mutually send and receive various kinds of signals and data to and from each of the higher-level devices, such as the eNB 20, the CSCF server 60, or the like.

Figure 2:
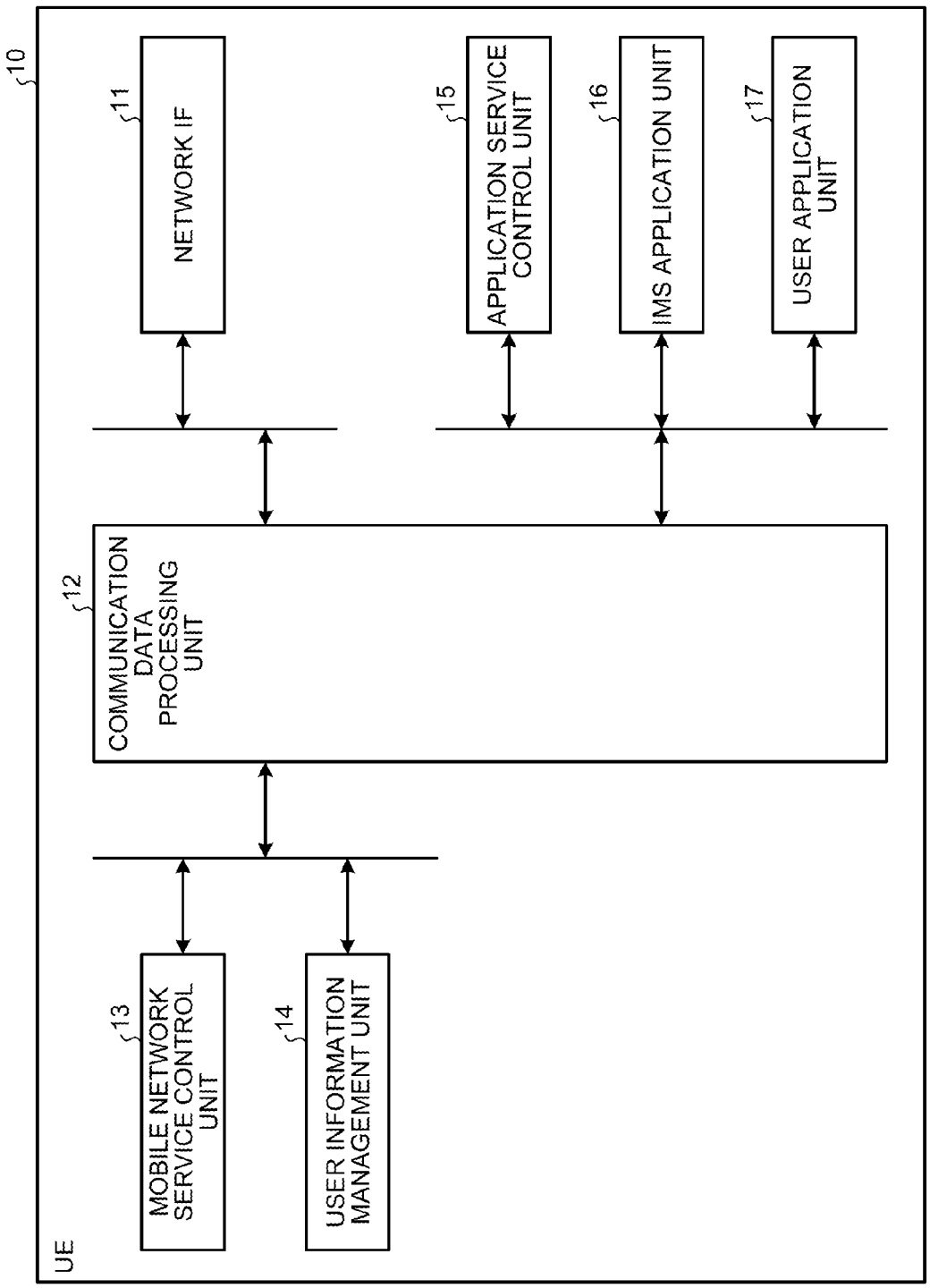
FIG. 2 is a schematic drawing illustrating the functional configuration of a UE.

In the following, the configuration of the UE 10 according to an embodiment disclosed in the present invention will be described. FIG. 2 is a schematic drawing illustrating the functional configuration of the UE 10. As illustrated in FIG. 2, the UE 10 includes a network interface (IF) 11, a communication data processing unit 12, a mobile network service control unit 13, a user information management unit 14, an application service control unit 15, an IMS application unit 16, and a user application unit 17. Each of the units is connected such that a signal or data can be input and output in a one-way or two-way direction.

The network IF 11 sends and receives various kinds of signals and data to and from the eNB 20. The communication data processing unit 12 performs a process related to data routing and a transfer protocol based on setting information on a bearer. The communication data processing unit 12 recognizes signaling information, such as a wireless access procedure message or the like, addressed to the own station and then inputs and outputs data from and to another functioning unit that performs a process on the signaling information. The mobile network service control unit 13 performs control of terminating a control signaling exchanged with the wireless access network N1 and the mobile core network N2 and performs control of setting and releasing a bearer. The user information management unit 14 holds user information, such as the location of a user, a bearer used by a user, or the like, acquired via the mobile network service control unit 13.

The application service control unit 15 controls a common service that can be used by all applications running on the UE 10. The application service control unit 15 provides, for example, a Notification Service. The IMS application unit 16 is an application that implements an IMS service. The IMS application unit 16 sends and receives control data to and from a communication application in the CSCF server 60 or a communication application in the CN 80 in the external packet network via the wireless access network N1 and the mobile core network N2. The user application unit 17 is a communication application used by a user. The user application unit 17 sends and receives user data to and from the communication application in the CN 80 in the external packet network via the wireless access network N1 and the mobile core network N2.

Figure 3:
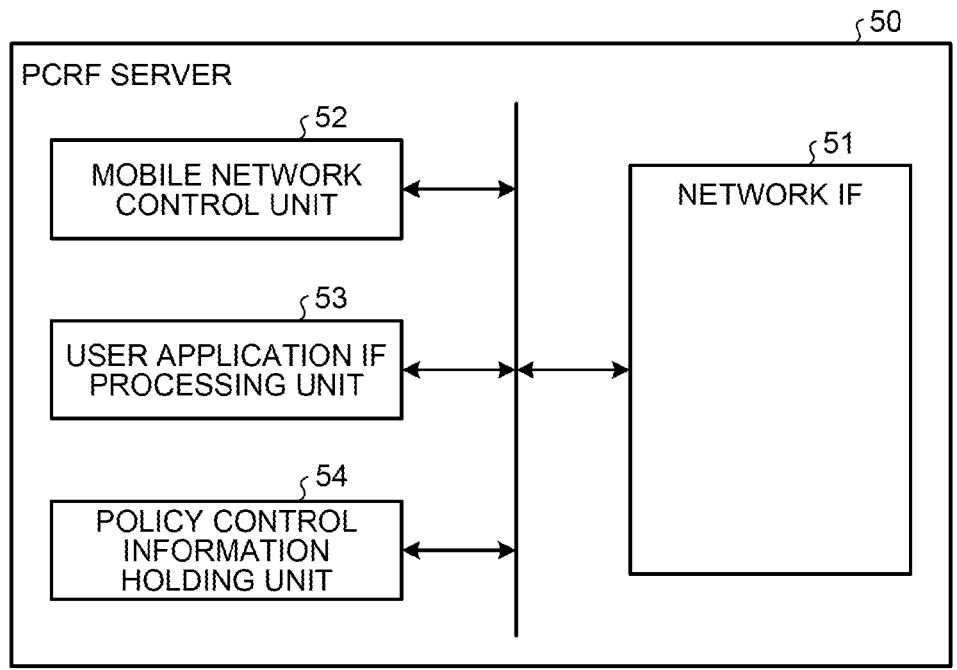
FIG. 3 is a schematic drawing illustrating the functional configuration of a PCRF server.

In the following, the configuration of the PCRF server 50 according to an embodiment disclosed in the present invention will be described. FIG. 3 is a schematic drawing illustrating the functional configuration of the PCRF server 50. As illustrated in FIG. 3, the PCRF server 50 includes a network IF 51, a mobile network control unit 52, a user application interface (IF) processing unit 53, and a policy control information holding unit 54. Each of the units is connected such that a signal or data can be input and output in a one-way or two-way direction.

The network IF 51 terminates L1 to L3 protocols that are unique to a network IF and sends and receives various kinds of data to and from an external node. The mobile network control unit 52 terminates a control signaling in a mobile network in order to set or release a bearer or in order to change the setting of Quality of Service (QoS). The user application IF processing unit 53 receives, from the user application unit 17 and a higher level service mechanism, a request for a bearer to be set and to be released or a request for control of a QoS and accounting. Furthermore, in response to these requests, the user application IF processing unit 53 terminates the control signaling exchanged with the service mechanism described above. The policy control information holding unit 54 holds control information that is used to set and release a bearer or that is used to control a QoS and accounting.

Figure 4:
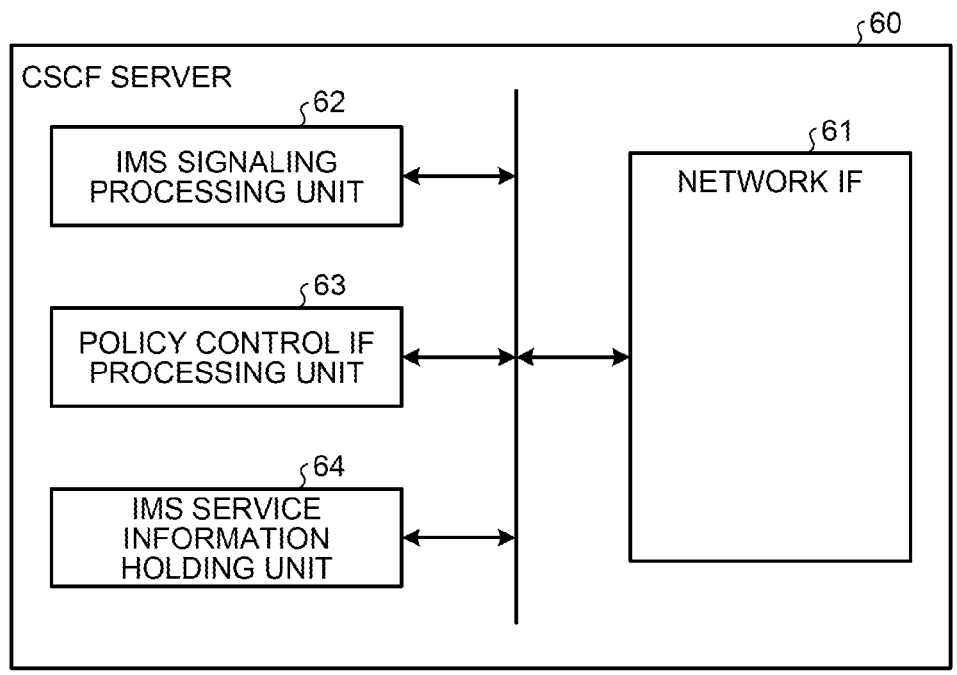
FIG. 4 is a schematic drawing illustrating the functional configuration of a CSCF server.

In the following, the configuration of the CSCF server 60 according to an embodiment disclosed in the present invention. FIG. 4 is a schematic drawing illustrating the functional configuration of the CSCF server 60. As illustrated in FIG. 4, the CSCF server 60 includes a network IF 61, an IMS signaling processing unit 62, a policy control interface (IF) processing unit 63, and an IMS service information holding unit 64. Each of the units is connected such that a signal or data can be input and output in a one-way or two-way direction.

The network IF 61 terminates the L1 to L3 protocol that is unique to the network IF and sends and receives various kinds of data to and from an external node. The IMS signaling processing unit 62 terminates the IMS control signaling between the UE 10 in order to provide an IMS service. The policy control IF processing unit 63 terminates the control signaling between the PCRF server 50 in order to control a QoS or accounting with respect to a bearer. The IMS service information holding unit 64 holds information related to an IMS service for each subscriber.

Figure 5:
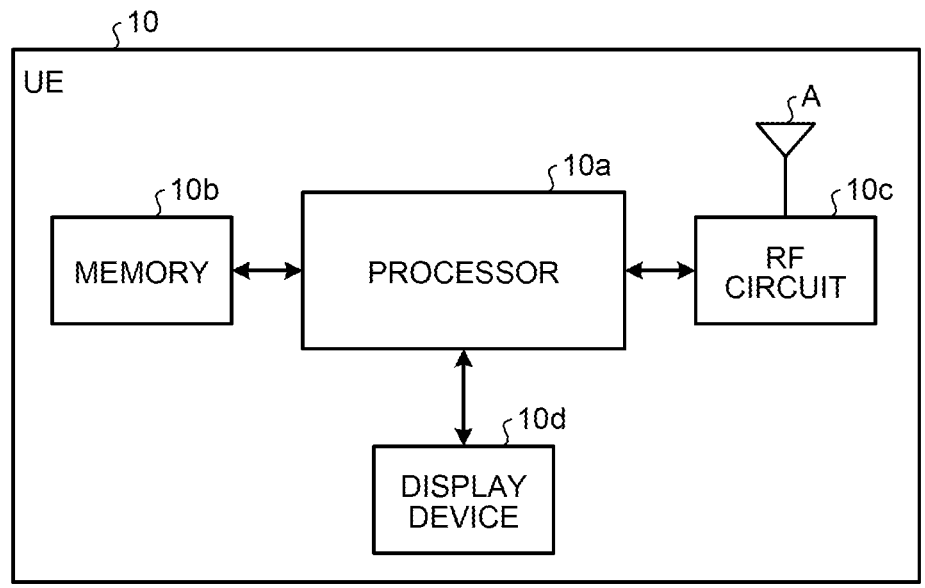
FIG. 5 is a schematic drawing illustrating the hardware configuration of the UE.

Then, the hardware configuration of the UE 10, the PCRF server 50, and the CSCF server 60 will be described. FIG. 5 is a schematic drawing illustrating the hardware configuration of the UE 10. As illustrated in FIG. 5, the UE 10 includes, from a hardware viewpoint, a processor 10a, a memory 10b, a radio frequency (RF) circuit 10c, and a display device 10d, such as a liquid crystal display (LCD) or the like. The RF circuit 10c includes an antenna A. The network IF 11 in the UE 10 is implemented by, for example, the RF circuit 10c. The communication data processing unit 12, the mobile network service control unit 13, the application service control unit 15, the IMS application unit 16, and the user application unit 17 are implemented by, for example, the processor 10a, such as a central processing unit (CPU), a digital signal processor (DSP), or the like. The user information management unit 14 is implemented by, for example, the memory 10b, such as a random access memory (RAM), a read only memory (ROM), a flash memory, or the like.

Figure 6:
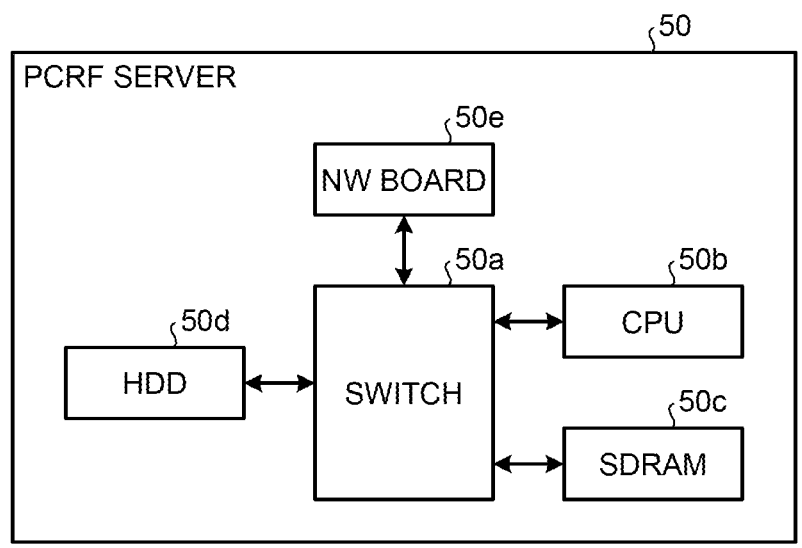
FIG. 6 is a schematic drawing illustrating the hardware configuration of the PCRF server.

FIG. 6 is a schematic drawing illustrating the hardware configuration of the PCRF server 50. As illustrated in FIG. 6, in the PCRF server 50, from a hardware viewpoint, a CPU 50b, a synchronous dynamic random access memory (SDRAM) 50c, a hard disk drive (HDD) 50d, and a network (NW) board 50e are connected via a switch 50a such that various kinds of signals or data can be input and output. The network IF 51 in the PCRF server 50 is implemented by, for example, the NW board 50e. The mobile network control unit 52 and the user application IF processing unit 53 are implemented by, for example, the CPU 50b. The policy control information holding unit 54 is implemented by, for example, the SDRAM 50c and the HDD 50d.

Figure 7:
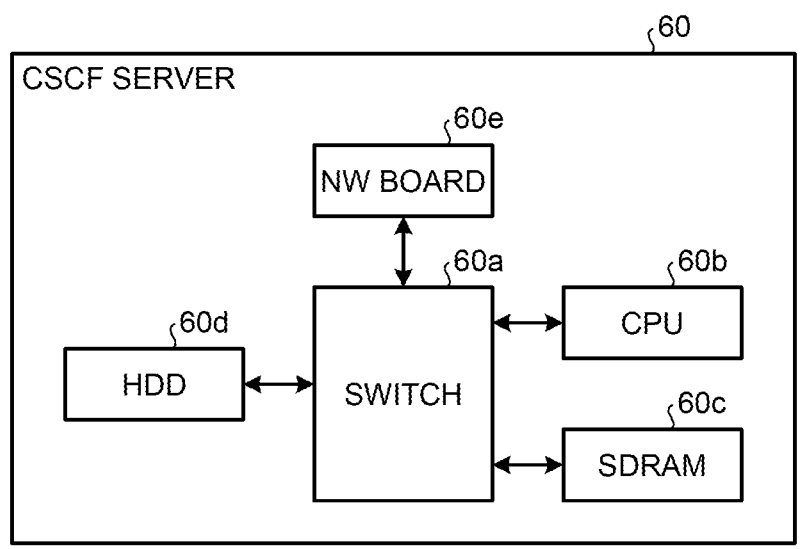
FIG. 7 is a schematic drawing illustrating the hardware configuration of the CSCF server.

FIG. 7 is a schematic drawing illustrating the hardware configuration of the CSCF server 60. As illustrated in FIG. 7, from a hardware viewpoint, the CSCF server 60 has the same configuration as that of the PCRF server 50. Specifically, in the CSCF server 60, a CPU 60b, an SDRAM 60c, an HDD 60d, and a NW board 60e are connected via a switch 60a such that various kinds of signals and data can be input and output. The network IF 61 in the CSCF server 60 is implemented by, for example, the NW board 60e. The IMS signaling processing unit 62 and the policy control IF processing unit 63 are implemented by, for example, the CPU 60b. The IMS service information holding unit 64 is implemented by, for example, the SDRAM 60c and the HDD 60d.

The application server 70 is provided by a provider of the operating system (OS) or the UE as a push-type Notification Service infrastructure that can be used by an application provider (third party). The application server 70 enables a start-up of an application included in the UE or enables a notification indicating that information (for example, a parameter, an item, or the like) that is used by the application is present on the network side.

In the following, an operation of the IMS control system 1 according to the first embodiment will be described.

Figure 8:
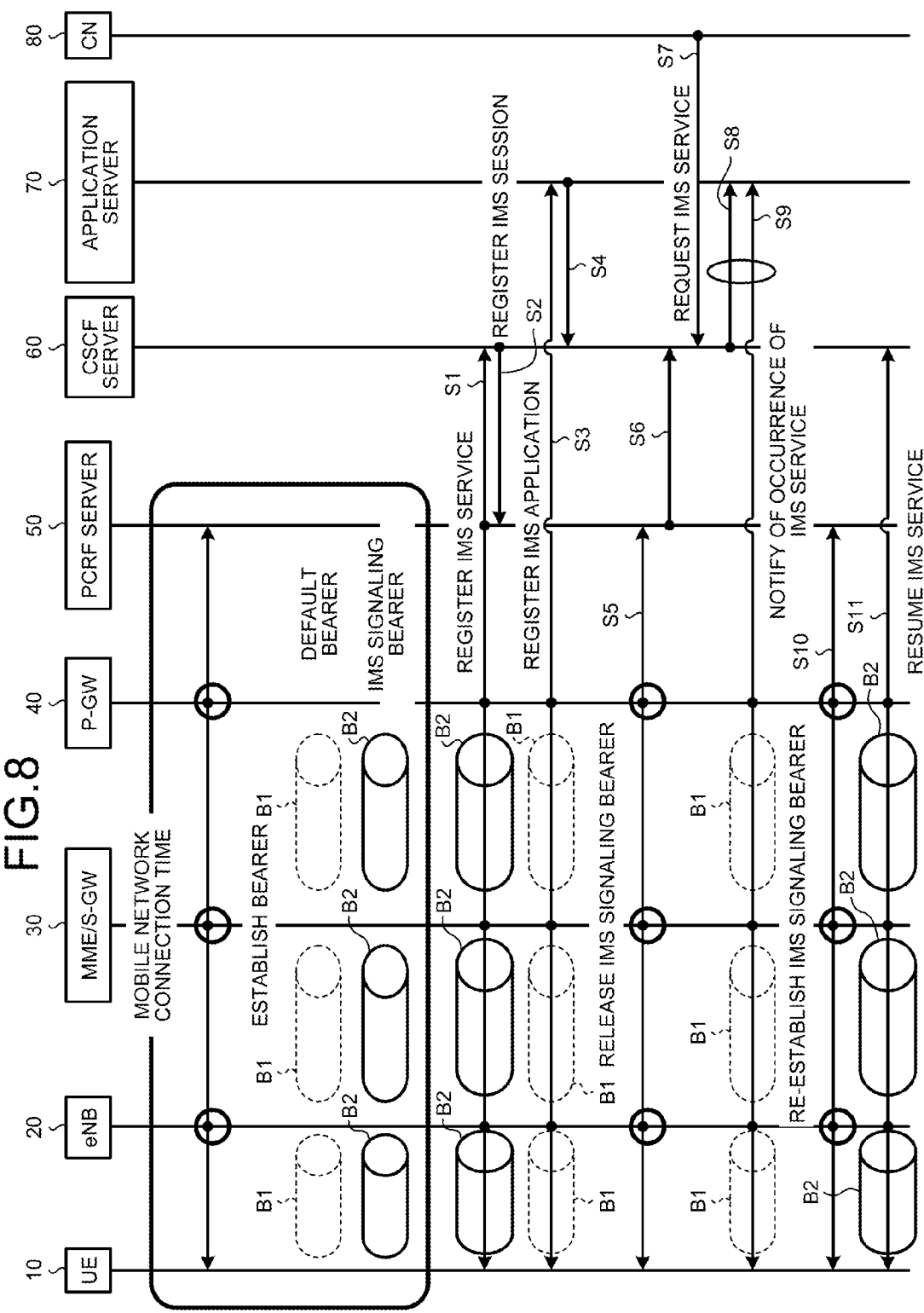
FIG. 8 is a sequence diagram illustrating an operation of the IMS control system.

FIG. 8 is a sequence diagram illustrating an operation of the IMS control system 1. First, at Step S1, by using an IMS signaling bearer B2 that has been established with the CSCF server 60, the UE 10 registers an IMS service (for example, an IP address) with respect to the CSCF server 60. At this point, the UE 10 sends, to the CSCF server 60, a token for an application used for the UE previously acquired from the application server 70 and then the CSCF server 60 stores therein the token. At Step S2, the CSCF server 60 registers an IMS session with respect to the PCRF server 50.

At Step S3, similar to Step S1, by using a default bearer B1 that has been established with the application server 70, the UE 10 registers an IMS application (for example, start to use an application) with respect to the application server 70. At Step S4, the application server 70 notifies the CSCF server 60 of the registration of the IMS application.

When the registration described above has been completed, the UE 10 temporarily releases the IMS signaling bearer B2 (Step S5) and the PCRF server 50 notifies the CSCF server 60 of the release of the bearer (Step S6).

Then, the CSCF server 60 receives an IMS service request (for example, a voice incoming call by using SIP) addressed to the UE 10 transmitted from a corresponding UE or a server (for example, the CN 80) (Step S7). At the time of reception, the CSCF server 60 checks that the UE 10 is a UE in which the IMS signaling bearer B2 has not been established at this point. This check process is performed by the CSCF server 60 acquiring, from the PCRF server 50, the establishment state of a bearer of each UE including the UE 10.

After the CSCF server 60 checks that the UE 10 has not established the IMS signaling bearer B2, the CSCF server 60 requests, by using the token described above, the application server 70 to notify the UE 10 of the occurrence of the IMS service (for example, a start-up request for an application in the UE 10) (Step S8). The application server 70 that has received the subject request sends, to the UE 10, the notification of the occurrence of the IMS service together with the token described above (Step S9).

When the UE 10 detects, due to the reception of the occurrence notification described above, the occurrence of the IMS service, the UE 10 starts up the application that is used to receive the IMS service and re-establishes the IMS signaling bearer B2 between the PCRF server 50 (Step S10). At Step S11, the UE 10 resumes, by using the started up application, an IMS service (for example, voice communication of the SIP incoming call). After the service has been ended, the IMS signaling bearer B2 is released again.

As described above, when the CSCF server 60 receives an IMS service request (for example, a SIP incoming call) addressed to the UE 10, the CSCF server 60 allows the UE 10 to start up the application and register the IMS service by using Notification Service infrastructure provided from the application server 70. Consequently, the UE 10 can receive an IMS service (for example, a SIP incoming call service) without always maintaining the IMS signaling bearer B2. Accordingly, the IMS control system 1 can suppress the consumption of the communication resource or electrical power occurring due to the IMS signaling bearer B2 being always maintained. Thus, the system can be efficiently operated.

Figure 9:
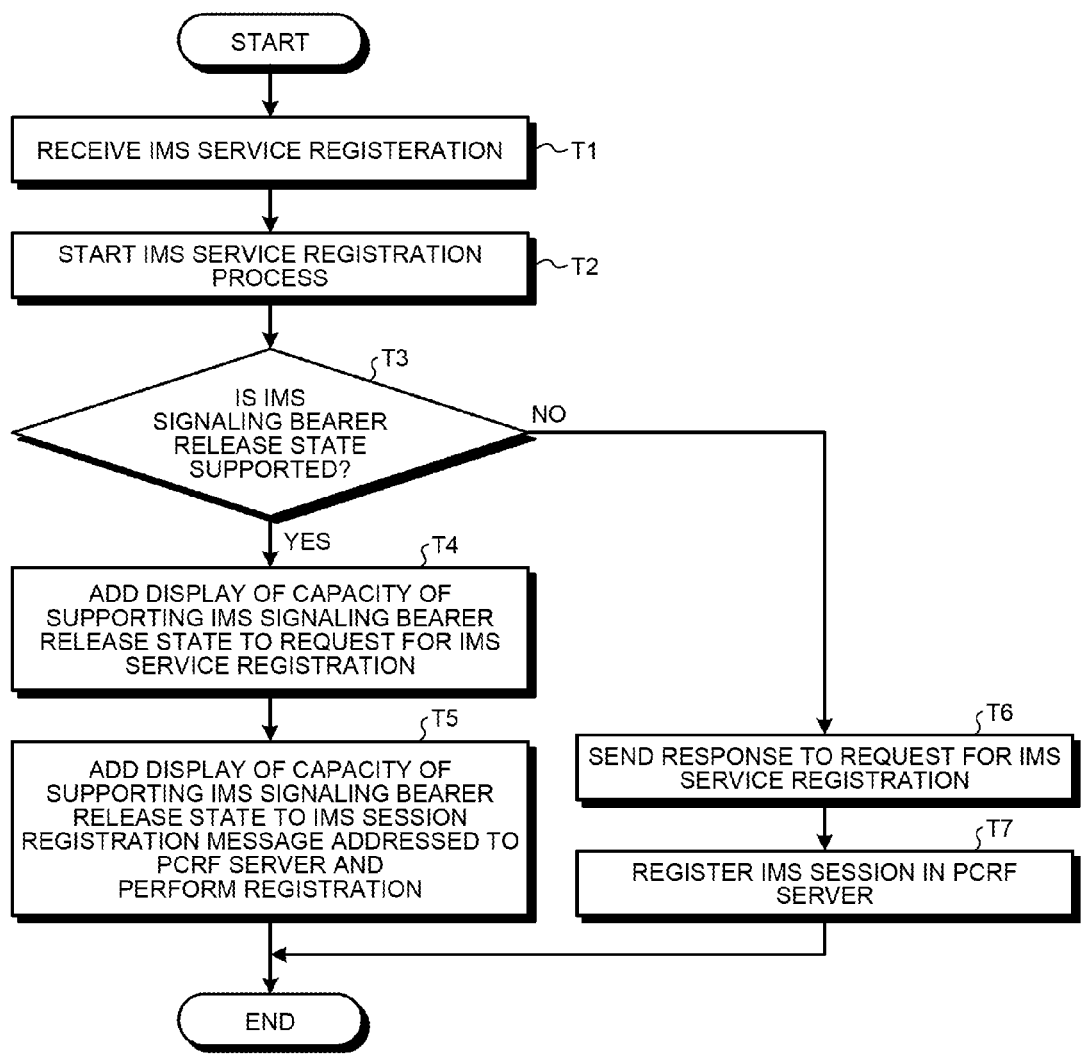
FIG. 9 is a flowchart illustrating the flow of an IMS service registration process performed by the CSCF server.

In the following, an operation of the CSCF server 60 will be described with reference to FIGS. 9 to 13. FIG. 9 is a flowchart illustrating the flow of an IMS service registration process performed by the CSCF server 60. First, when the network IF 61 receives a request for an IMS service registration from the UE 10 (Step T1), the IMS signaling processing unit 62 starts to perform the IMS service registration process (Step T2). At Step T3, the IMS signaling processing unit 62 refers to the IMS service information holding unit 64 and determines whether the UE 10 supports the IMS signaling bearer release state.

If the determination result indicates that the support performed by the UE 10 has been detected (Yes at Step T3), the IMS signaling processing unit 62 adds displaying of the support capacity of the IMS signaling bearer release state to the request for the IMS service registration described above (Step T4). At Step T5, the IMS signaling processing unit 62 adds displaying of the support capacity of the IMS signaling bearer release state to an IMS session registration message that is addressed to the PCRF server 50 and then performs the IMS service registration.

In contrast, if the determination result obtained at Step T3 indicates that the support by the UE 10 has not been detected (No at Step T3), the IMS signaling processing unit 62 sends back a response to the request for the IMS service registration to the UE 10 via the network IF 61 (Step T6). Then, the IMS signaling processing unit 62 registers an IMS session in the PCRF server 50 via the policy control IF processing unit 63 (Step T7).

Figure 10:
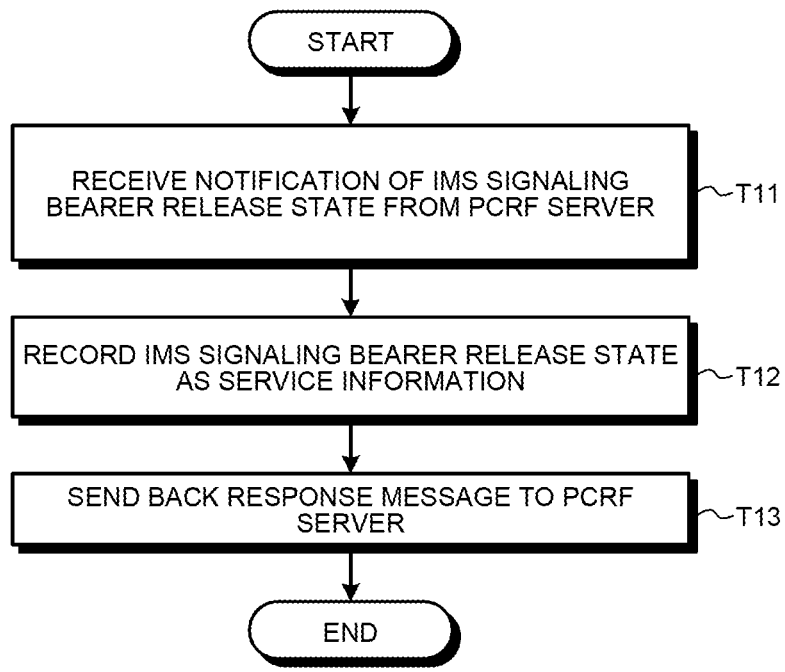
FIG. 10 is a flowchart illustrating the flow of a recording process of an IMS signaling bearer release state performed by the CSCF server.

FIG. 10 is a flowchart illustrating the flow of a recording process of an IMS signaling bearer release state performed by the CSCF server 60. At Step T11, the network IF 61 receives a notification of the release state of the IMS signaling bearer B2 from the PCRF server 50. At Step T12, the policy control IF processing unit 63 allows the IMS service information holding unit 64 to record the release state described above as the service information on the UE 10. At Step T13, the policy control IF processing unit 63 sends back a response message to the PCRF server 50 via the network IF 61.

Figure 11:
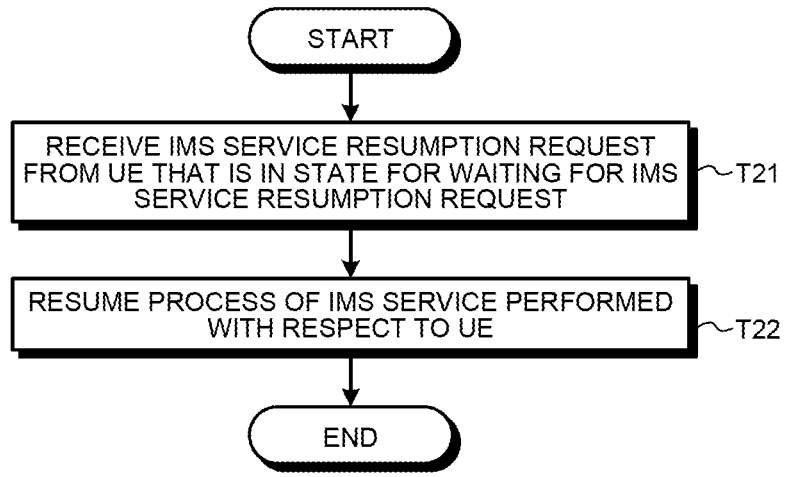
FIG. 11 is a flowchart illustrating the flow of an IMS service resumption process performed by the CSCF server.

FIG. 11 is a flowchart illustrating the flow of an IMS service resumption process performed by the CSCF server 60. At Step T21, the network IF 61 receives an IMS service resumption request from the UE 10 that is in a state for waiting for the IMS service resumption request. Accordingly, the IMS signaling processing unit 62 resumes the process of the IMS service performed with respect to the UE 10 (Step T22). The process performed at Step T22 and the subsequent processes are the same as those performed in a related IMS control system; therefore, descriptions thereof will be omitted.

Figure 12:
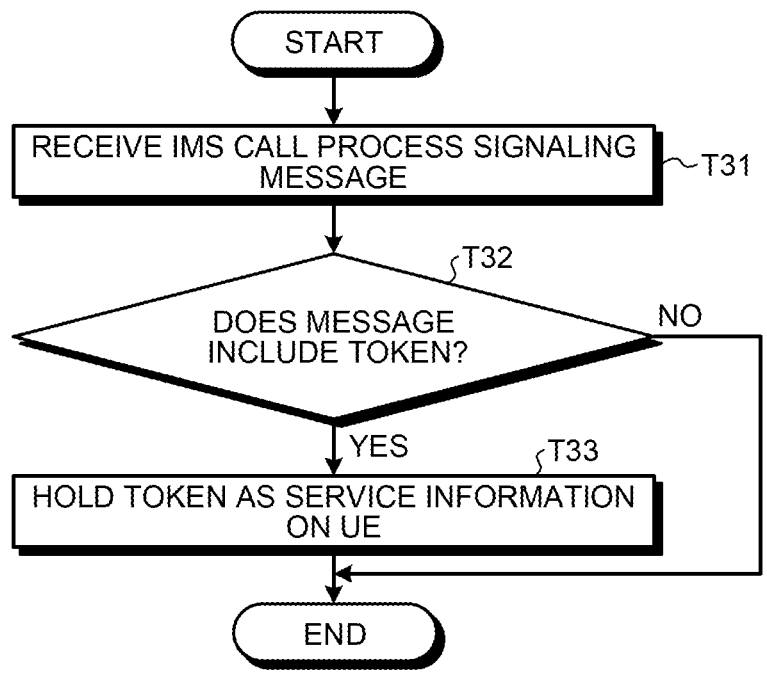
FIG. 12 is a flowchart illustrating the flow of a token recording process performed by the CSCF server according to a first embodiment.

FIG. 12 is a flowchart illustrating the flow of a token recording process performed by the CSCF server 60 according to a first embodiment. At Step T31, the network IF 61 receives an IMS call process signaling message from the UE 10. Then, the IMS signaling processing unit 62 determines whether the message received at Step T31 includes a token that is used to request the application server 70 of a notification of the occurrence of the IMS service (Step T32). If the determination result indicates that the message includes the token (Yes at Step T32), the IMS signaling processing unit 62 allows the IMS service information holding unit 64 to hold the received token as the service information related to the UE 10 (Step T33). In contrast, if the determination result obtained at Step T32 indicates that the message described above does not include the token (No at Step T32), the process to be performed at Step T33 is omitted. The process performed at Step T33 and the subsequent processes are the same as those performed in the related IMS control system; therefore, descriptions thereof will be omitted.

Figure 13:
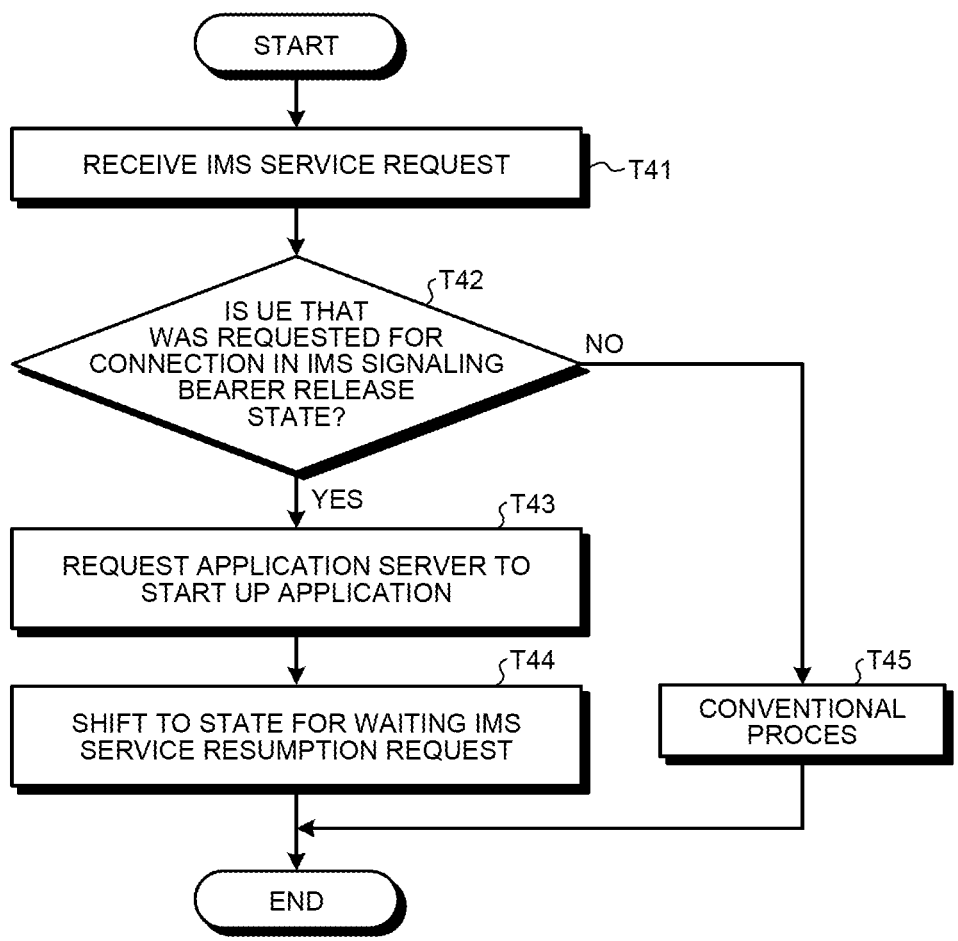
FIG. 13 is a flowchart illustrating the flow of an application start up request process performed by the CSCF server according to the first embodiment.

FIG. 13 is a flowchart illustrating the flow of an application start-up request process performed by the CSCF server 60 according to the first embodiment. First, when the network IF 61 receives a request for an IMS service (for example, a voice SIP incoming call addressed to the UE 10) from the CN 80 (Step T41), the IMS signaling processing unit 62 determines whether the UE 10 that was requested for a connection due to the above described request is in a state in which the IMS signaling bearer B2 has been released (Step T42).

If the determination result indicates that the UE 10 is in a bearer release state (Yes at Step T42), the IMS signaling processing unit 62 requests, by using the token that was previously acquired from the UE 10, the application server 70 to start up the IMS application in the UE 10 (Step T43). Then, the IMS signaling processing unit 62 shifts to a state for waiting for the IMS service resumption request issued by the UE (Step T44). If the determination result obtained at Step T42 indicates that the UE 10 is not in the bearer release state (No at Step T42), the processes at Steps T43 and T44 are not performed and the same processes conventionally performed are performed (Step T45).

Figure 14:
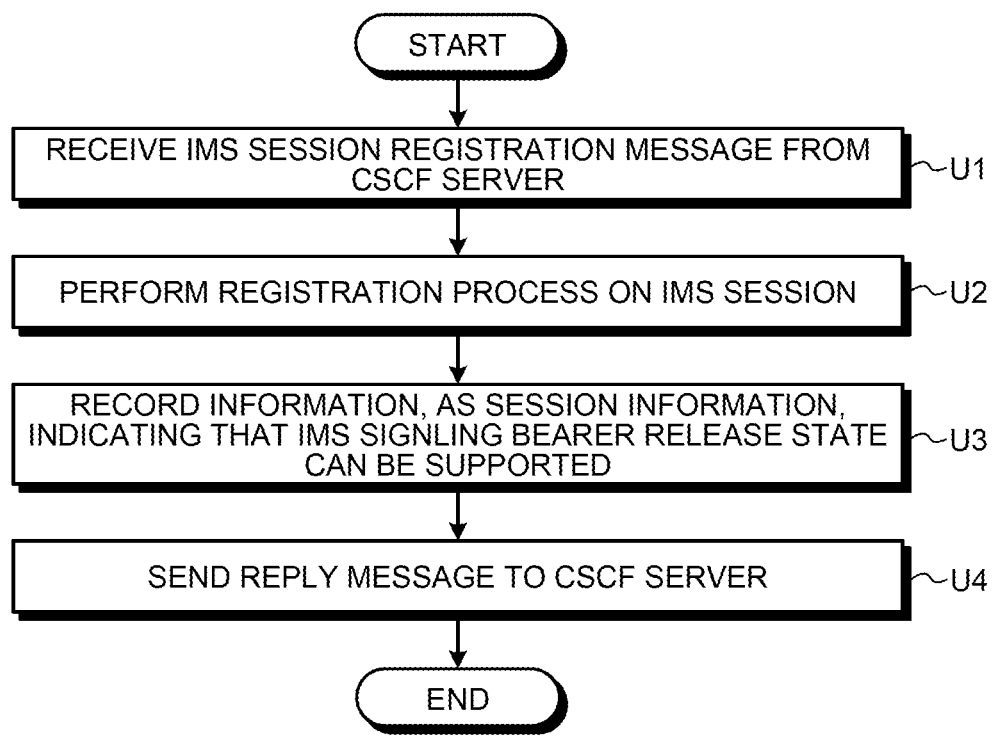
FIG. 14 is a flowchart illustrating the flow of an IMS session registration process performed by the PCRF server.

In the following, an operation of the PCRF server 50 will be described with reference to FIGS. 14 and 15. FIG. 14 is a flowchart illustrating the flow of an IMS session registration process performed by the PCRF server 50. When the network IF 51 in the PCRF server 50 receives an IMS session registration message from the CSCF server 60 (Step U1), the user application IF processing unit 53 performs the IMS session registration process (Step U2).

At Step U3, if the message described above includes a support capacity related to the IMS signaling bearer release state to be displayed, the user application IF processing unit 53 allows the policy control information holding unit 54 to record the information, as session information, indicating that the support capacity is available for the release state described above. Then, the user application IF processing unit 53 sends back, to the CSCF server 60, a message response to the IMS session registration message (Step U4).

Figure 15:
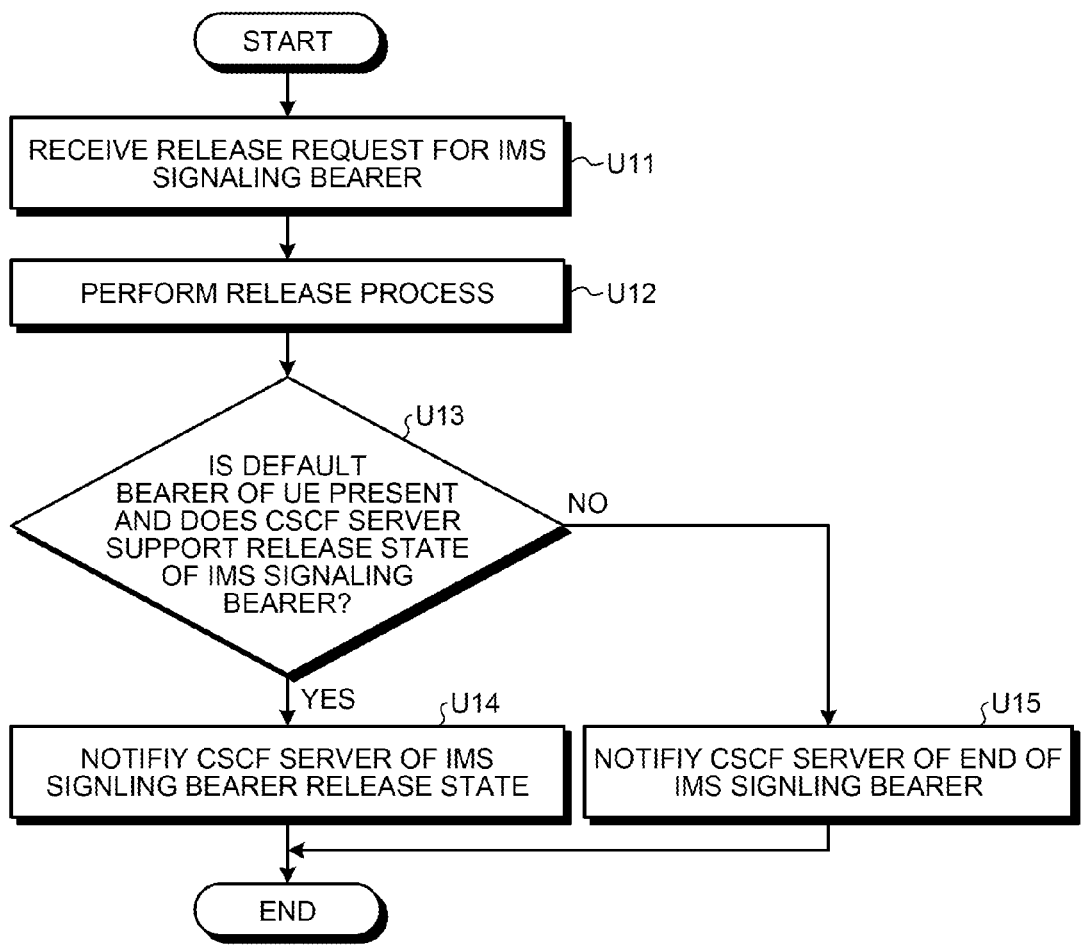
FIG. 15 is a flowchart illustrating the flow of an IMS signaling bearer release process performed by the PCRF server.

FIG. 15 is a flowchart illustrating the flow of an IMS signaling bearer release process performed by the PCRF server 50. If the network IF 51 in the PCRF server 50 receives a release request for the IMS signaling bearer B2 from the UE 10 that is being connected (Step U11), the mobile network control unit 52 performs a process for releasing the IMS signaling bearer B2 established between the UE 10 and the PCRF server 50 (Step U12).

At Step U13, the mobile network control unit 52 in the PCRF server 50 determines whether the default bearer B1 of the UE 10 is present and determines whether the CSCF server 60 that accommodates the UE 10 supports the IMS signaling bearer B2 release state. If the determination result indicates that both conditions are satisfied (Yes at Step U13), the mobile network control unit 52 notifies the CSCF server 60 that the IMS signaling bearer B2 between the UE 10 and the PCRF server 50 are in the release state (Step U14). In contrast, if at least one of the conditions is not satisfied (No at Step U13), the mobile network control unit 52 notifies the CSCF server 60 of the termination of the IMS signaling bearer B2 between the UE 10 and the PCRF server 50 (Step U15).

Figure 16:
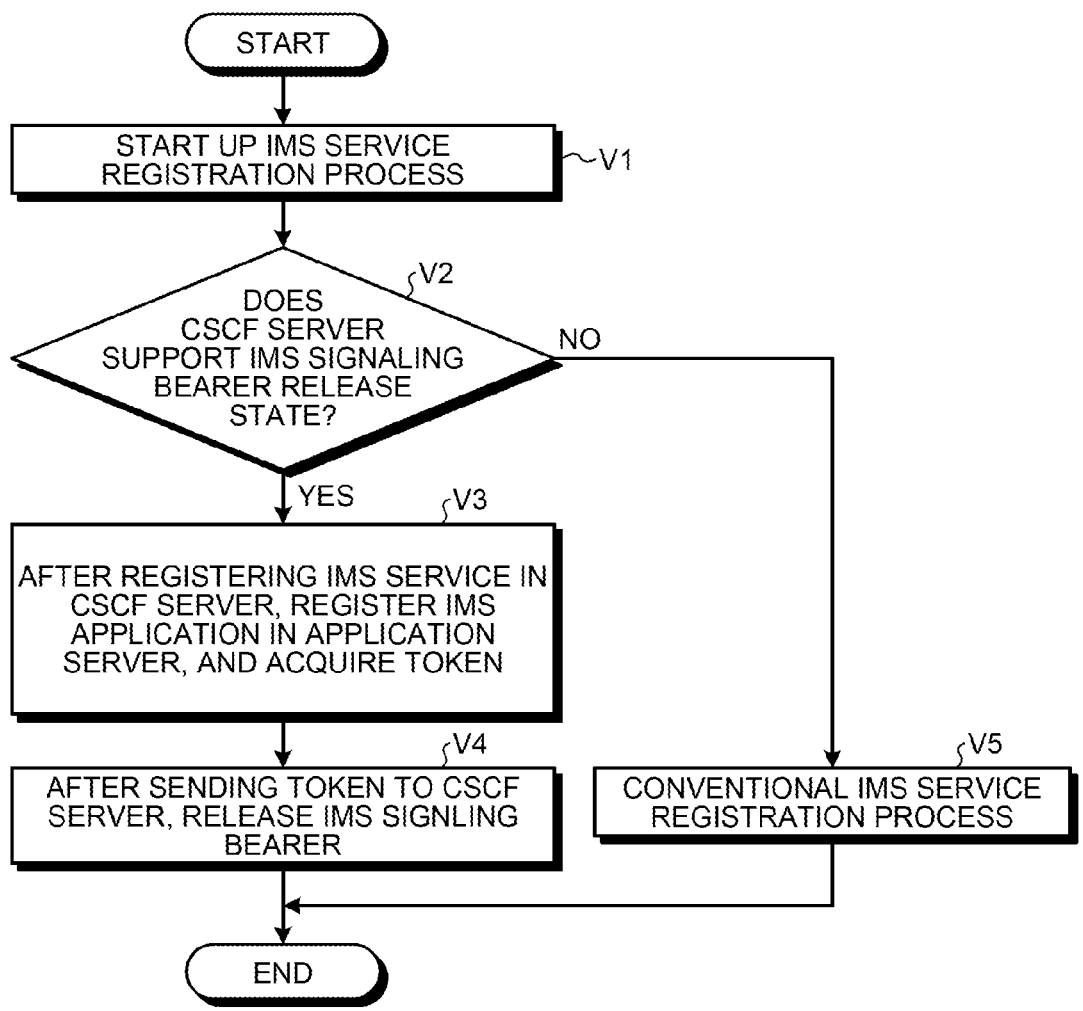
FIG. 16 is a flowchart illustrating the flow of an IMS service registration process performed by the UE according to the first embodiment.

In the following, an operation of the UE 10 will be described with reference to FIGS. 16 and 17. FIG. 16 is a flowchart illustrating the flow of an IMS service registration process performed by the UE 10 according to the first embodiment. First, the IMS application unit 16 in the UE 10 starts to perform the IMS service registration process (Step V1). Then, the IMS application unit 16 determines, based on the information acquired from the CSCF server 60 that is the access destination, whether the CSCF server 60 supports the IMS signaling bearer release state (Step V2).

If the determination result indicates that the support has been detected (Yes at Step V2), the IMS application unit 16 registers the IMS service in the CSCF server 60 and then performs an IMS application registration with respect to the application server 70. Accordingly, the IMS application unit 16 acquires a token from the application server 70 via the network IF 11 (Step V3). At Step V4, after the application service control unit 15 sends the token acquired at Step V3 to the CSCF server 60, the application service control unit 15 releases the IMS signaling bearer B2. At this time, the information needed for receiving the service acquired from the CSCF server 60 when the IMS service registration performed at Step V3 is held in the user information management unit 14.

If the determination result obtained at Step V2 indicates that the CSCF server 60 does not support the release state described above (No at Step V2), the IMS application unit 16 performs the related IMS service registration process without performing the processes at Steps V3 and V4 described above (Step V5).

Figure 17:
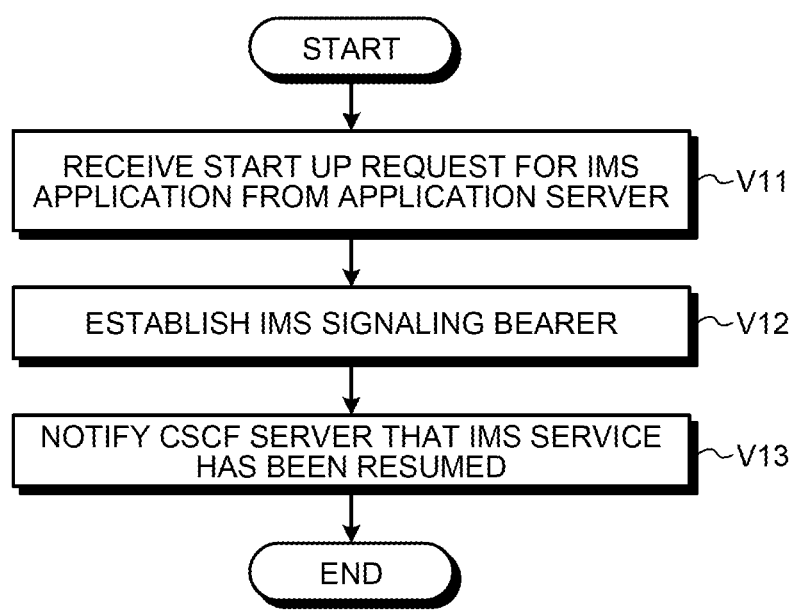
FIG. 17 is a flowchart illustrating the flow of an IMS signaling bearer establishment process performed by the UE according to the first embodiment.

FIG. 17 is a flowchart illustrating the flow of an IMS signaling bearer establishment process performed by the UE 10 according to the first embodiment. At Step V11, the network IF 11 in the UE 10 receives a start-up request for the IMS application from the application server 70. At Step V12, the IMS application unit 16 establishes, in accordance with the start-up request, the IMS signaling bearer B2 between the UE 10 and the CSCF server 60. At Step V13, the IMS application unit 16 notifies the CSCF server 60 that the IMS service has been resumed. The process performed at Step V13 and the subsequent processes are the same as those performed in the related IMS service; descriptions thereof will be omitted.

As described above, the IMS control system 1 according to the first embodiment includes the UE 10 and the CSCF server 60 that can communicate with the UE 10. The UE 10 includes the network IF 11 and the mobile network service control unit 13. By using the IMS signaling bearer B2 established between the UE 10 and the CSCF server 60, the network IF 11 registers, in the CSCF server 60, the usage of a predetermined service (for example, an IMS service). After the usage of the service described above is registered by the network IF 11, the mobile network service control unit 13 releases the IMS signaling bearer B2. The CSCF server 60 includes the network IF 61 and the IMS signaling processing unit 62. The network IF 61 detects the occurrence of the service described above with respect to the UE 10. If the occurrence of the service described above is detected by the network IF 61, the IMS signaling processing unit 62 requests the application server 70 to notify the UE 10 of the occurrence of the service described above. In response to the request from the IMS signaling processing unit 62, due to a notification sent from the application server 70 to the UE 10 indicating the occurrence of the service described above, the mobile network service control unit 13 in the UE 10 re-establishes the IMS signaling bearer B2 that was released by the mobile network service control unit 13.

Furthermore, the application server 70 may also be a server that provides an application to the UE 10. The UE 10 may also further includes the application service control unit 15. If, in addition to the occurrence of the service described above, a start-up request for the application included in the UE 10 is received, the application service control unit 15 may also start up the subject application. Furthermore, the IMS signaling bearer B2 may also be a communication path used for voice control.

As described above, the application server 70 notifies, in accordance with an instruction from the CSCF server 60, the UE 10 of the occurrence of the IMS service. In the notification, a start-up request for an application that is used by the UE 10 for using the IMS service. Because the application server 70 previously acquired the token held by the UE 10 via the CSCF server 60, the application server 70 can request, by using the subject token, the UE 10 to start up the application. Furthermore, in the UE 10, by starting up the application for using the IMS service that that was notified to be occurred, it is possible to start to use the IMS service (for example, a voice communication due to a SIP incoming call) by using the re-established bearer.

[b] Second Embodiment

In the following, a second embodiment will be described. An IMS control system according to the second embodiment has the same configuration as that of the IMS control system according to the first embodiment illustrated in FIG. 1. Furthermore, the configuration of a UE according to the second embodiment is the same as that of the UE according to the first embodiment illustrated in FIGS. 2 and 5. Furthermore, the configuration of a PCRF server according to the second embodiment is the same as that of the PCRF server according to the first embodiment illustrated in FIGS. 3 and 6. Furthermore, the configuration of a CSCF server according to the second embodiment is the same as that of the CSCF server according to the first embodiment illustrated in FIGS. 4 and 7. Accordingly, in the second embodiment, the components having the same configuration as those in the first embodiment are assigned the same reference numerals and descriptions of such components in detail are omitted. The second embodiment differs from the first embodiment in that a device that notifies the UE 10 of the occurrence of an IMS service is arranged.

Specifically, in the first embodiment, the application server 70 notifies the UE 10 of the occurrence of an IMS service; however, in the second embodiment, the PCRF server 50 sends a notification of the occurrence of the IMS service. More specifically, in the first embodiment, when the CSCF server 60 detects the occurrence of the IMS service with respect to the UE 10, the CSCF server 60 requests the application server 70 to notify the UE 10 of the occurrence described above. In contrast, in the second embodiment, the CSCF server 60 that detects the occurrence of the IMS service with respect to the UE 10 requests the PCRF server 50 to send a notification of the occurrence. The PCRF server 50 that receives the subject request establishes the IMS signaling bearer B2 between the UE 10 and then notifies the UE 10 occurrence of the IMS service described above. In the following, an operation of the IMS control system 1 according to the second embodiment will be described with reference to FIG. 18 by mainly concentrating on the difference between the first embodiment.

Figure 18:
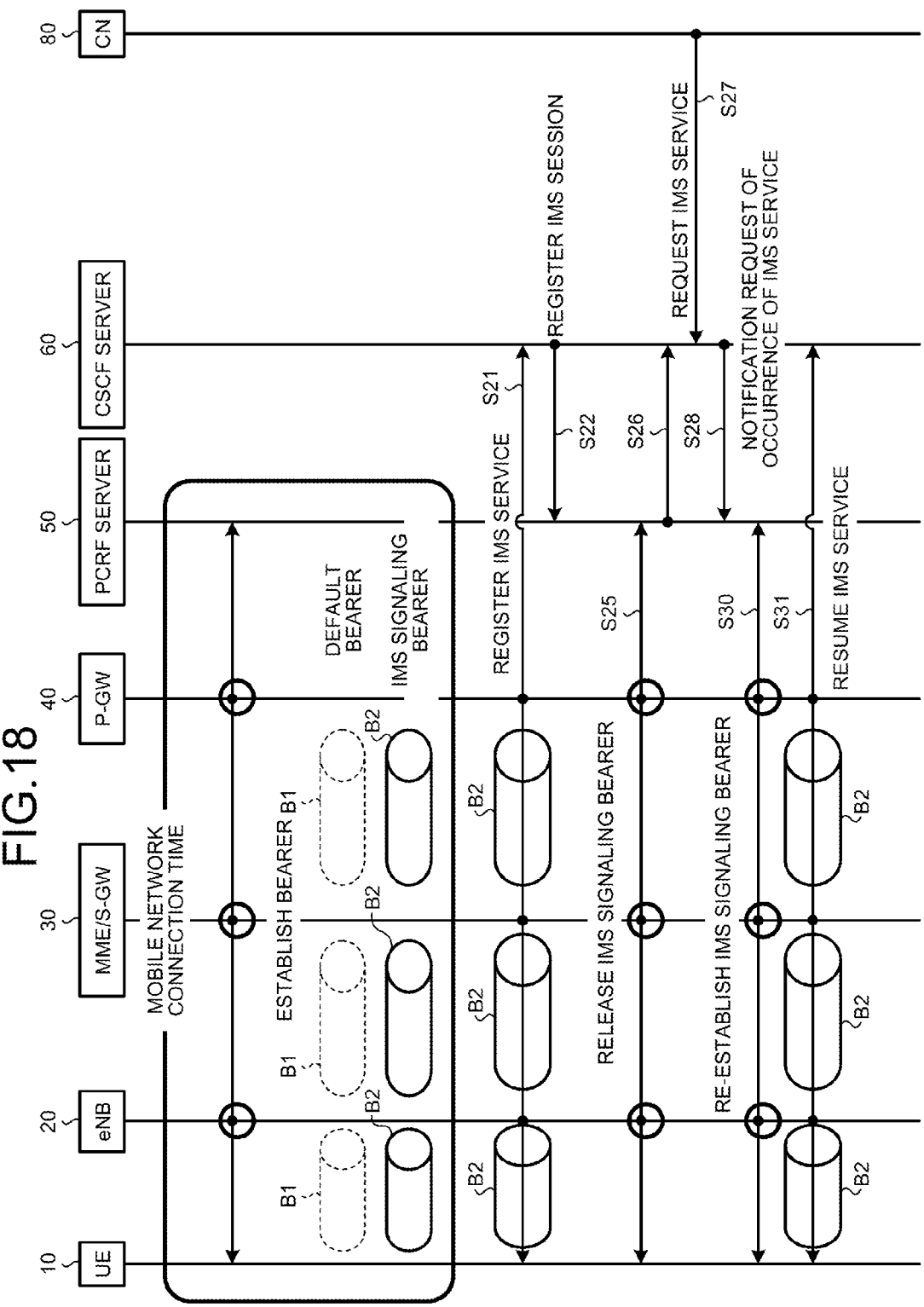
FIG. 18 is a sequence diagram illustrating an operation of an IMS control system according to a second embodiment.

FIG. 18 is a sequence diagram illustrating an operation of the IMS control system 1 according to a second embodiment. The processes illustrated in FIG. 18 are the same as those illustrated in FIG. 8 that is referred to in the description of the operation according to the first embodiment except for the process performed at Step S28. Accordingly, processes performed at the same steps are assigned reference numerals with the same last numbers and descriptions of such processes in detail are omitted. Specifically, the processes performed at Steps S21, S22, S25 to S28, S30, and S31 illustrated in FIG. 18 correspond to the processes performed at Steps S1, S2, S5 to S8, S10, and S11 illustrated in FIG. 8. However, at Step S28 illustrated in FIG. 18, unlike the process performed at Step S8 illustrated in FIG. 8, the CSCF server 60 requests the PCRF server 50 to notify the occurrence of the IMS service. Furthermore, in the first embodiment, the re-establishment process of the IMS signaling bearer B2 is performed from the UE 10 side that receives the notification of the occurrence of the IMS service; however, in the second embodiment, it is possible to perform the establishment from the PCRF server 50 side, i.e., from the network side.

First, an operation of the CSCF server 60 according to the second embodiment will be described. Among the processes performed by the CSCF server 60 according to the second embodiment, the IMS service registration process (see FIG. 9), the IMS signaling bearer release state recording process (see FIG. 10), and the IMS service resumption process (see FIG. 11) are the same as those in the first embodiment. Accordingly, the drawings and descriptions of these processes in detail will be omitted. In the following, an IMS signaling bearer establishment request process that is a unique process performed by the CSCF server 60 according to the second embodiment will be described with reference to FIG. 19.

Figure 19:
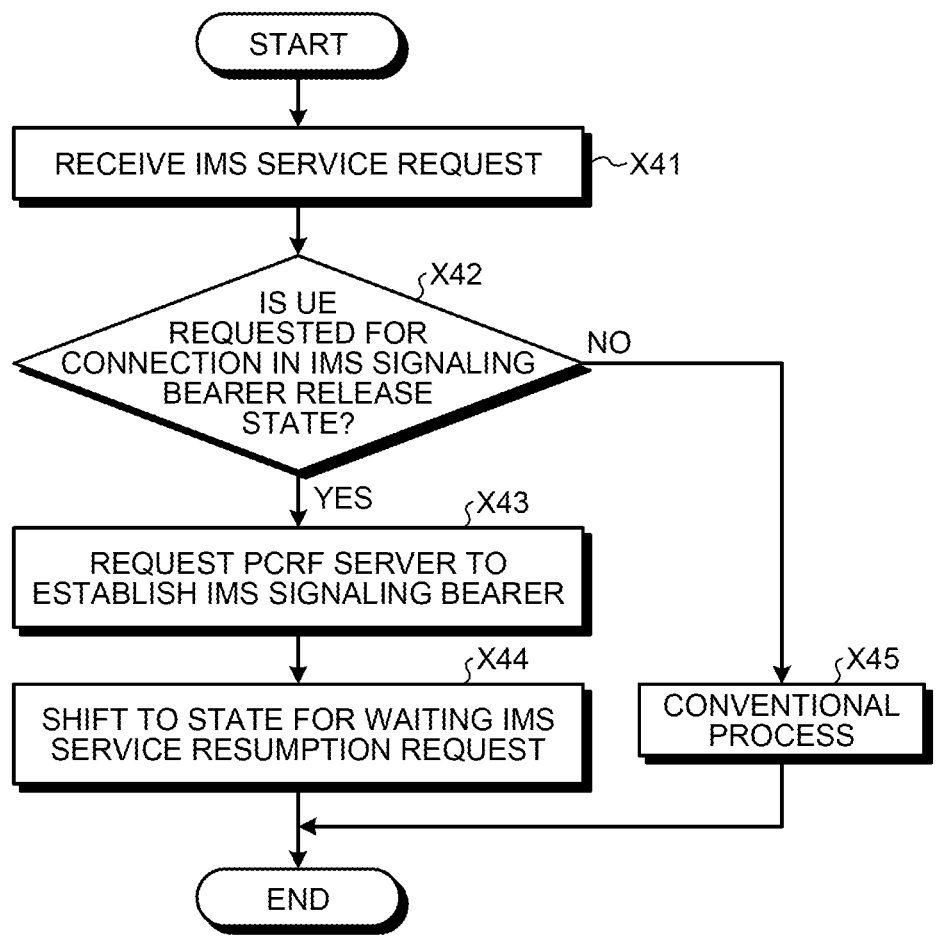
FIG. 19 is a flowchart illustrating the flow of an IMS signaling bearer establishment request process performed by the CSCF server according to the second embodiment.

FIG. 19 is a flowchart illustrating the flow of an IMS signaling bearer establishment request process performed by the CSCF server 60 according to the second embodiment. First, when the network IF 61 receives a request for an IMS service (for example, a voice SIP incoming call addressed to the UE 10) from the CN 80 (Step X41), the IMS signaling processing unit 62 determines whether the UE 10 that was requested for a connection due to the above described request is in a release state of the IMS signaling bearer B2 (Step X42).

If the determination result indicates that the UE 10 is in the bearer release state (Yes at Step X42), the IMS signaling processing unit 62 requests the PCRF server 50 to establish the IMS signaling bearer B2 between the UE 10 (Step X43). Then, the IMS signaling processing unit 62 shifts to a state for waiting for IMS service resumption request issued by the UE 10 (Step X44). If the determination result obtained at Step X42 indicates that the UE 10 is not in the bearer release state (No at Step X42), the processes at Steps X43 and X44 are not performed and the same processes conventionally performed are performed (Step X45).

In the following, an operation of the PCRF server 50 according to the second embodiment will be described. Among the processes performed by the PCRF server 50 according to the second embodiment, the IMS session registration process (see FIG. 14) and the IMS signaling bearer releasing process (see FIG. 15) are the same as those performed in the first embodiment. Accordingly, the drawings and descriptions of these processes in detail will be omitted. In the following, an IMS signaling bearer establishment process that is a unique process performed by the PCRF server 50 according to the second embodiment will be described with reference to FIG. 20.

Figure 20:
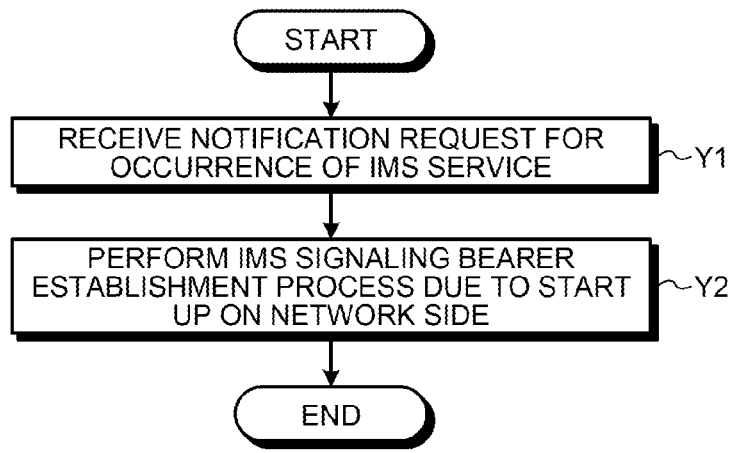
FIG. 20 is a flowchart illustrating the flow of an IMS signaling bearer establishment process performed by an PCRF server according to the second embodiment.

FIG. 20 is a flowchart illustrating the flow of an IMS signaling bearer establishment process performed by the PCRF server 50 according to the second embodiment. At Step Y1, the network IF 51 in the PCRF server 50 receives a notification request for the occurrence of the IMS service from the CSCF server 60. At Step Y2, the user application IF processing unit 53 performs an establishment process for the IMS signaling bearer B2 between the PCRF server 50 and the UE 10 and completes the establishment of the bearer from the network side.

Figure 21:
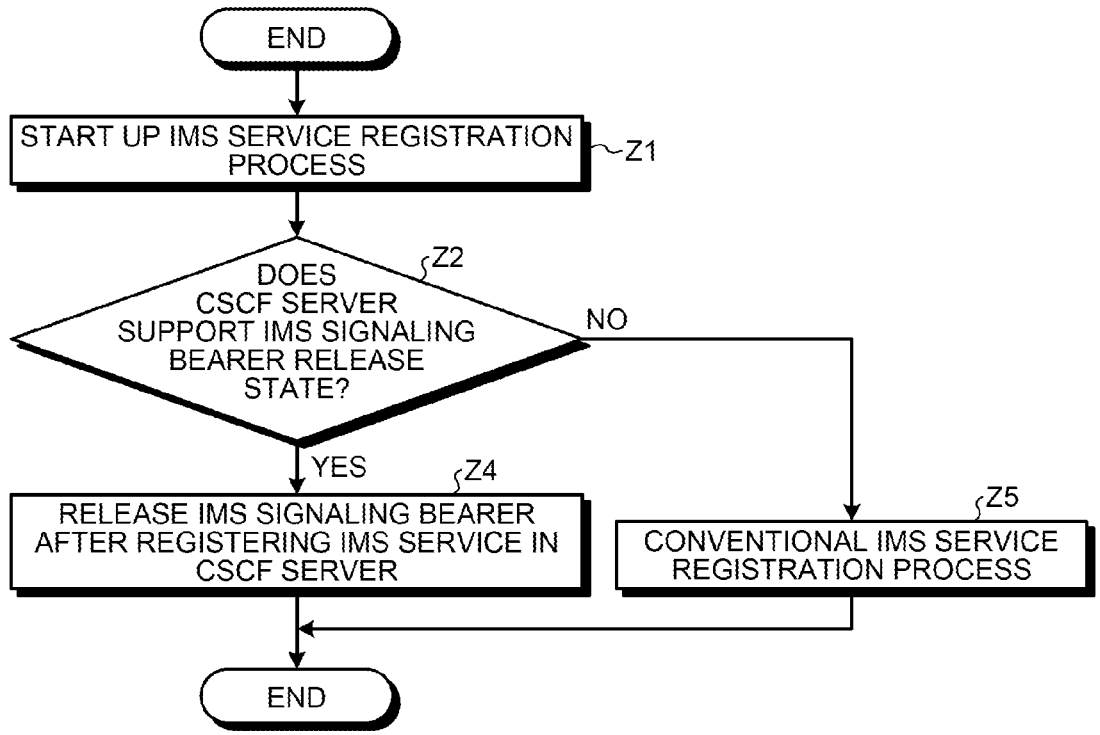
FIG. 21 is a flowchart illustrating the flow of an IMS service registration process performed by a UE according to the second embodiment.

In the following, an operation of the UE 10 according to the second embodiment will be described. In a description below, the IMS service registration process and the IMS signaling bearer establishment process that are unique processes performed by the UE 10 according to the second embodiment will be described with reference to FIGS. 21 and 22. FIG. 21 is a flowchart illustrating the flow of an IMS service registration process performed by the UE 10 according to the second embodiment. First, the IMS application unit 16 in the UE 10 starts the IMS service registration process (Step Z1). Then, based on the information acquired from the CSCF server 60 that is the access destination, the IMS application unit 16 determines whether the CSCF server 60 supports the IMS signaling bearer release state (Step Z2).

If the determination result indicates that the support is detected (Yes at Step Z2), the IMS application unit 16 registers the IMS service in the CSCF server 60 and then releases the IMS signaling bearer B2 (Step Z4). The information that is needed to receive the service and that is acquired by the CSCF server 60 when the IMS service is registered is held by the user information management unit 14.

If the determination result obtained at Step Z2 indicates that the CSCF server 60 does not support the release state (No at Step Z2), the IMS application unit 16 performs the related IMS service registration process without performing the process at Step Z4 described above (Step Z5).

Figure 22:
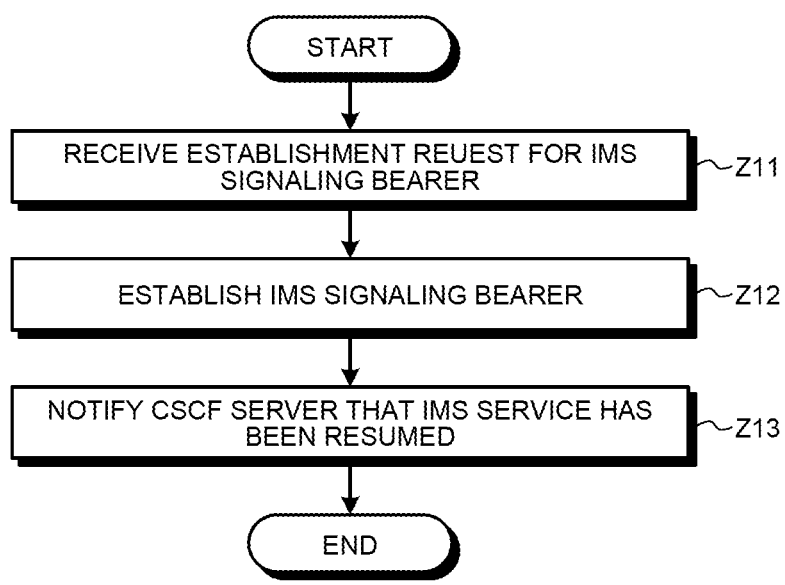
FIG. 22 is a flowchart illustrating the flow of an IMS signaling bearer establishment process performed by the UE according to the second embodiment.

FIG. 22 is a flowchart illustrating the flow of an IMS signaling bearer establishment process performed by the UE 10 according to the second embodiment. At Step Z11, the network IF 11 in the UE 10 receives an establishment request for the IMS signaling bearer B2 from the PCRF server 50. At Step Z12, the mobile network service control unit 13 establishes, in accordance with the establishment request, the IMS signaling bearer B2 between the UE 10 and the PCRF server 50. At Step Z13, by using the IMS signaling bearer B2 established at Step Z12, the mobile network service control unit 13 notifies the CSCF server 60 of the resumption of the IMS service. The process performed at Step Z13 and the subsequent processes are the same as those performed in the related IMS service; therefore, descriptions thereof will be omitted.

As described above, the IMS control system 1 according to the second embodiment includes the UE 10 and the CSCF server 60 that can communicate with the UE 10. The UE 10 includes the network IF 11 and the mobile network service control unit 13. The network IF 11 registers, in the CSCF server 60 by using the IMS signaling bearer B2 established between the UE 10 and the CSCF server 60, the usage of a predetermined service (for example, an IMS service). The mobile network service control unit 13 releases the IMS signaling bearer B2 after the usage of the service described above has been registered by the network IF 11. The CSCF server 60 includes the network IF 61 and the IMS signaling processing unit 62. The network IF 61 detects the occurrence of the service described above with respect to the UE 10. If the occurrence of the service described above has been detected by the network IF 61, the IMS signaling processing unit 62 requests the PCRF server 50 to notify the UE 10 of the occurrence of the subject service. In response to the request from the IMS signaling processing unit 62, due to a notification sent from the PCRF server 50 to the UE 10 indicating the occurrence of the service described above, the mobile network service control unit 13 in the UE 10 re-establishes the IMS signaling bearer B2 that was released by the mobile network service control unit 13.

Furthermore, the PCRF server 50 may also be a server that establishes and releases the IMS signaling bearer B2 between the UE 10. The PCRF server 50 may further include the mobile network control unit 52. The mobile network control unit 52 may also notify, in response to a request from the IMS signaling processing unit 62 in the CSCF server 60, the UE 10 of the occurrence of an IMS service and may also re-establish the IMS signaling bearer B2 that was released by the mobile network service control unit 13.

With the IMS control system 1 according to the second embodiment, an IMS service (for example, a SIP incoming call service) can be received even if the IMS signaling bearer B2 is always maintained by the UE 10. Accordingly, the IMS control system 1 can suppress the communication resources and electrical power consumed in accordance with the IMS signaling bearer B2 being always maintained. Consequently, the system can be efficiently operated. In particular, with the IMS control system 1 according to the second embodiment, when compared with the first embodiment, the volume of messages to be processed by the UE 10 can be reduced. Accordingly, with the IMS control system 1 according to the second embodiment, the same effect as that obtained in the first embodiment can be obtained while suppressing the load applied to a mobile station.

In each of the embodiments described above, the description has been given with the assumption that the UE is a mobile station, such as a mobile phone, a smart phone, a personal digital assistant (PDA), or the like. However, the present invention may also be applied not only to mobile stations but also to various communication devices that can establish and release various bearers between the PCRF server 50.

Furthermore, each of the components in the IMS control system 1 is not always need to be physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the mobile network service control unit 13 and the application service control unit 15 in the UE 10 or the IMS signaling processing unit 62 and the policy control IF processing unit 63 in the CSCF server 60 may also be integrated as a single unit. In contrast, the application service control unit 15 in the UE 10 may also be separated by dividing it into a unit that sends the acquired token to the CSCF server 60 and a unit that releases the IMS signaling bearer B2. Furthermore, the policy control IF processing unit 63 may also be separated by dividing it into a unit that records the release state of the IMS signaling bearer B2 into the IMS service information holding unit 64 and a unit that sends the response message to the PCRF server 50. Furthermore, the memory 10b, the HDD 50d, and the HDD 60d may also be used as an external device of the UE 10, the PCRF server 50, and the CSCF server 60, respectively, and be connected via a network or a cable.

Furthermore, in the above description, the configuration and the operation have been described for each embodiment. However, a single IMS control system 1 may also have the functions specific to the first and the second embodiments. For example, the CSCF server 60 may also have a function of requesting both the application server 70 and the PCRF server 50 to send a notification of the occurrence of an IMS service.

According to an aspect of embodiments of a wireless communication system disclosed in the present invention, an advantage is provided in that consumption of the resource can be suppressed when a service is provided to a mobile station.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
a mobile station; and
a first server in a mobile core network that communicates with the mobile station, wherein
the mobile station includes:
  a first processor configured to:
    register, in the first server by using a communication path established between the mobile station and the first server, the usage of a predetermined service; and
    release the communication path after the usage of the service has been registered,
the first server includes:
  a second processor configured to:
    detect occurrence of the service provided to the mobile station; and
    request, when the occurrence of the service is detected by a second server to notify the mobile station of the occurrence of the service, and
the releasing includes re-establishing, in response to the request, due to a notification indicating the occurrence of the service, sent from the second server to the mobile station, the communication path that has been released, wherein
the registering includes registering of an Internet protocol Multimedia Subsystem (IMS) service by using an IMS signaling bearer, and registering of an IMS application by using a default bearer.

2. The wireless communication system according to claim 1, wherein
the second server is a server that provides an application to the mobile station, and
the first processor is configured to start up the application when, in addition to the notification of the occurrence of the service, a start-up of the application held by the mobile station is requested.

3. The wireless communication system according to claim 1, wherein the second server is a server that establishes and releases the communication path between the mobile station, and the second server includes:
  a third processor configured to:
    notify, in response to the request, the mobile station of the occurrence of the service and re-establish the communication path that has been released control unit.

4. The wireless communication system according to claim 1, wherein the communication path is a communication path used for voice control.

5. A mobile station that communicates with a first server in a mobile core network, the mobile station comprising:
  a processor configured to:
    register, in the first server by using a communication path established between the mobile station and the first server, the usage of a predetermined service; and
    release the communication path after the usage of the service has been registered and re-establish, when the first server detects occurrence of the service provided to the mobile station, in response to a request from the first server, due to a notification indicating the occurrence of the service, sent from a second server to the mobile station, the released communication path, wherein
  the registering includes registering of an Internet protocol Multimedia Subsystem (IMS) service by using an IMS signaling bearer, and registering of an IMS application by using a default bearer.

6. A server in a mobile core network that communicates with a mobile station, the server comprising:
  a processor configured to:
    register, by using a communication path established between the mobile station and the server, the usage of a predetermined service and detect, after the communication path has been released, occurrence of the service provided to the mobile station; and
    request, when the occurrence of the service is detected upon the registering, another server other than the server to notify the mobile station of the occurrence of the service, wherein
  the registering includes registering of an Internet protocol Multimedia Subsystem (IMS) service by using an IMS signaling bearer, and registering of an IMS application by using a default bearer.

7. A wireless communication method comprising:
  registering, in a first server of a mobile core network, the registering performed by a first processor in a mobile station by using a communication path established between the mobile station and the first server, the usage of a predetermined service,
  releasing, performed by the mobile station after the usage of the service has been registered, the communication path, by the first processor;
  detecting, performed by the first server, occurrence of the service provided to the mobile station, by a second processor;
  requesting, performed by the first server, when the occurrence of the service is detected, a second server to notify the mobile station of the occurrence of the service, by the second processor; and
  re-establishing, performed by the mobile station, in response to the request, due to a notification indicating the occurrence of the service, sent from the second server to the mobile station, the released communication path, by the first processor, wherein
  the registering includes registering of an Internet protocol Multimedia Subsystem (IMS) service by using an IMS signaling bearer, and registering of an IMS application by using a default bearer.

* * * * *